United States Patent
Hara et al.

(10) Patent No.: US 8,459,201 B2
(45) Date of Patent: Jun. 11, 2013

(54) DROPLET APPLYING DEVICE, DROPLET APPLYING METHOD, LIQUID CRYSTAL DISPLAY PANEL MANUFACTURING APPARATUS, AND LIQUID CRYSTAL DISPLAY PANEL MANUFACTURING METHOD

(75) Inventors: Satoru Hara, Fujisawa (JP); Takahiro Yamazaki, Yokohama (JP); Akihiro Shigeyama, Yokohama (JP); Hideyuki Suzuki, Tsu (JP); Makoto Kanbe, Sakurai (JP); Tadashi Shiozaki, Sakai (JP)

(73) Assignees: Shibaura Mechatronics Corporation, Yokohama-shi (JP); Sharp Kabushiki Kaisha, Osaka (JP)

( * ) Notice: Subject to any disclaimer, the term of this patent is extended or adjusted under 35 U.S.C. 154(b) by 283 days.

(21) Appl. No.: 12/741,211

(22) PCT Filed: Nov. 6, 2008

(86) PCT No.: PCT/JP2008/070179
§ 371 (c)(1),
(2), (4) Date: May 4, 2010

(87) PCT Pub. No.: WO2009/060884
PCT Pub. Date: May 14, 2009

(65) Prior Publication Data
US 2010/0255208 A1    Oct. 7, 2010

(30) Foreign Application Priority Data
Nov. 8, 2007   (JP) ................. 2007-290756

(51) Int. Cl.
*B05C 11/00* (2006.01)
*B05B 7/06* (2006.01)
*B05B 13/02* (2006.01)

(52) U.S. Cl.
USPC ........... 118/686; 118/687; 118/313; 118/315; 118/305

(58) Field of Classification Search
USPC .................. 118/313–315, 319, 320, 52, 612, 118/305, 321, 323, 686, 687, 665; 156/578, 156/356, 538; 349/187; 257/88, 98
See application file for complete search history.

(56) References Cited

U.S. PATENT DOCUMENTS

| | | | |
|---|---|---|---|
| 7,102,726 B2 | 9/2006 | Byun et al. | |
| 2004/0001177 A1 | 1/2004 | Byun et al. | |
| 2005/0061238 A1* | 3/2005 | Sakurada | ...................... 118/300 |
| 2008/0002137 A1* | 1/2008 | Kim et al. | ..................... 349/187 |

FOREIGN PATENT DOCUMENTS

| | | |
|---|---|---|
| JP | 9 105937 | 4/1997 |
| JP | 2006 35075 | 2/2006 |
| JP | 2006 320839 | 11/2006 |
| TW | I267672 | 12/2006 |

* cited by examiner

*Primary Examiner* — Yewebdar Tadesse
(74) *Attorney, Agent, or Firm* — Oblon, Spivak, McClelland, Maier & Neustadt, L.L.P.

(57) ABSTRACT

A droplet applying device (2) includes: application heads (2d) configured to eject an application liquid as multiple droplets toward to-be-coated subjects (K1, K2); a moving mechanism (2c) configured to move each of the to-be-coated subjects (K1, K2) and the application heads (2d) relative to each other; and a rotating mechanism (2b) configured to rotate the to-be-coated subjects (K1, K2) in a plane intersecting with an ejecting direction in which the multiple droplets are ejected.

2 Claims, 7 Drawing Sheets

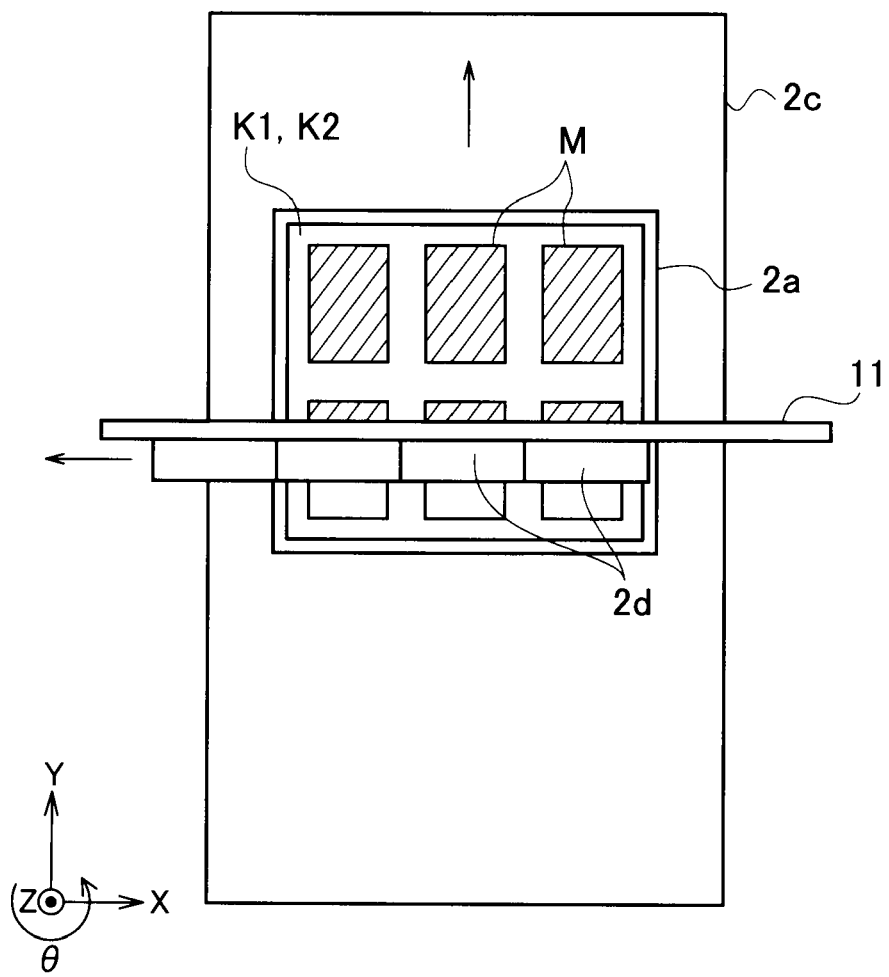

DROPLET APPLYING DEVICE, DROPLET APPLYING METHOD, LIQUID CRYSTAL DISPLAY PANEL MANUFACTURING APPARATUS, AND LIQUID CRYSTAL DISPLAY PANEL MANUFACTURING METHOD

TECHNICAL FIELD

The present invention relates to a droplet applying device, a droplet applying method, a liquid crystal display panel manufacturing apparatus, and a liquid crystal display panel manufacturing method. More particularly, the present invention relates to a droplet applying device configured to eject and apply droplets onto a to-be-coated subject and a droplet applying method, as well as to a liquid crystal display panel manufacturing apparatus and a liquid crystal display panel manufacturing method for manufacturing a liquid crystal display panel.

BACKGROUND ART

A droplet applying device is used, for example, for forming an application film such as an alignment film on a substrate as a to-be-coated subject when manufacturing, for example, a display device such as a liquid crystal display panel (see Patent Document 1, for example). This droplet applying device includes an application head configured to eject (spray) an application liquid as droplets from multiple ejection holes (nozzles) toward the substrate. While moving the substrate on a stage and the application head relative to each other, the droplet applying device allows the multiple droplets to be sequentially landed from the application head onto a coated surface of the substrate, thereby forming the application film such as an alignment film on the coated surface of the substrate.

In a manufacturing process of a liquid crystal display panel, the droplet applying device forms the alignment films on display areas of two substrates to be bonded together. Thereafter, a sealant is applied onto one of those substrates so as to surround the display area, and then liquid crystal is dripped in the area surrounded by the applied sealant. Lastly, the substrate after dripping and the other substrate are aligned with each other in a vacuum atmosphere inside a vacuum chamber or the like, and then are bonded together under pressure, thereby forming the liquid crystal display panel.

[Patent Document 1] JP-A 9-105937

DISCLOSURE OF THE INVENTION

However, in the above-described manufacturing process, the droplets are sequentially applied in the same longitudinal direction on the two substrates to be bonded together. Accordingly, the liquid crystal display panel with the two substrates bonded together tends to have conspicuous streaky (striped) display unevenness (visual unevenness), thereby degrading quality of the liquid crystal display panel.

The present invention has been made to solve the above-described problem and an object thereof is to provide a droplet applying device, a droplet applying method, a liquid crystal display panel manufacturing apparatus, and a liquid crystal display panel manufacturing method capable of preventing degradation in quality of a liquid crystal display panel attributable to streaky display unevenness.

A first aspect according to an embodiment of the present invention is a droplet applying device characterized by comprising: an application head configured to eject an application liquid as a plurality of droplets toward each to-be-coated subject; a moving mechanism configured to move the to-be-coated subject and the application head relative to each other; and a rotating mechanism configured to rotate the to-be-coated subject in a plane intersecting with an ejecting direction in which the plurality of droplets are ejected.

A second aspect according to an embodiment of the present invention is a droplet applying method characterized by comprising the steps of: rotating each to-be-coated subject in a plane intersecting with an ejecting direction in which a plurality of droplets are ejected from an application head configured to eject an application liquid as the plurality of droplets toward the to-be-coated subject; and applying the application liquid to the to-be-coated subject by using the application head while moving the to-be-coated subject and the application head relative to each other.

A third aspect according to an embodiment of the present invention is a liquid crystal display panel manufacturing apparatus characterized by comprising: a droplet applying device including an application head configured to eject an application liquid as a plurality of droplets toward a to-be-coated subject, a moving mechanism configured to move the to-be-coated subject and the application head relative to each other, and a rotating mechanism configured to rotate the to-be-coated subject in a plane intersecting with an ejecting direction in which the plurality of droplets are ejected; and a bonding device configured to bond together a first to-be-coated subject and a second to-be-coated subject each being the to-be-coated subject having the application liquid applied thereto, on the basis of a bonding specification used to bond together the first to-be-coated subject and the second to-be-coated subject.

A fourth aspect according to an embodiment of the present invention is a liquid crystal display panel manufacturing method characterized by comprising the steps of: rotating a to-be-coated subject in a plane intersecting with an ejecting direction in which a plurality of droplets are ejected from an application head configured to eject an application liquid as the plurality of droplets toward the to-be-coated subject; applying the application liquid to the to-be-coated subject by using the application head while moving the to-be-coated subject and the application head relative to each other; and bonding together a first to-be-coated subject and a second to-be-coated subject each being the to-be-coated subject having the application liquid applied thereto, on the basis of a bonding specification used to bond the first to-be-coated subject to the second to-be-coated subject.

A fifth aspect according to an embodiment of the present invention is a droplet applying device characterized by comprising: an application head configured to eject an application liquid as a plurality of droplets toward each to-be-coated subject; and a moving mechanism configured to move the to-be-coated subject and the application head relative to each other in a direction along a surface of the to-be-coated subject, characterized in that the moving mechanism moves each of the to-be-coated subjects and the application head relative to each other in such a manner that, when a first to-be-coated subject and a second to-be-coated subject each being the to-be-coated subject having the application liquid applied thereto are bonded together on the basis of a bonding specification used to bond together the first to-be-coated subject and the second to-be-coated subject, an application direction in which the plurality of droplets are sequentially landed on the first to-be-coated subject intersects with an application direction in which the plurality of droplets are sequentially landed on the second to-be-coated subject.

A sixth aspect according to an embodiment of the present invention is a droplet applying method characterized by comprising the step of: applying an application liquid to a to-be-coated subject by using an application head configured to eject the application liquid as a plurality of droplets toward each to-be-coated subject while moving the to-be-coated subject and the application head relative to each other, characterized in that the applying step includes moving each of the to-be-coated subjects and the application head relative to each other in such a manner that, when a first to-be-coated subject and a second to-be-coated subject each being the to-be-coated subject having the application liquid applied thereto are bonded together on the basis of a bonding specification used to bond together the first to-be-coated subject and the second to-be-coated subject, an application direction in which the plurality of droplets are sequentially landed on the first to-be-coated subject intersects with an application direction in which the plurality of droplets are sequentially landed on the second to-be-coated subject.

A seventh aspect according to an embodiment of the present invention is a liquid crystal display panel manufacturing apparatus characterized by comprising: a droplet applying device including an application head configured to eject an application liquid as a plurality of droplets toward a to-be-coated subject, and a moving mechanism configured to move the to-be-coated subject and the application head relative to each other in a direction along a surface of the to-be-coated subject; and a bonding device configured to bond together a first to-be-coated subject and a second to-be-coated subject each being the to-be-coated subject having the application liquid applied thereto, on the basis of a bonding specification used to bond the first to-be-coated subject to the second to-be-coated subject, characterized in that the moving mechanism moves each of the to-be-coated subjects and the application head relative to each other in such a manner that, when the first to-be-coated subject and the second to-be-coated subject are bonded together on the basis of the bonding specification, an application direction in which the plurality of droplets are sequentially landed on the first to-be-coated subject intersects with an application direction in which the plurality of droplets are sequentially landed on the second to-be-coated subject.

An eighth aspect according to an embodiment of the present invention is a liquid crystal display panel manufacturing method characterized by comprising the steps of: applying an application liquid to a to-be-coated subject by using an application head configured to eject the application liquid as the plurality of droplets toward the to-be-coated subject while moving the to-be-coated subject and the application head relative to each other; and bonding together a first to-be-coated subject and a second to-be-coated subject each being the to-be-coated subject having the application liquid applied thereto, on the basis of a bonding specification used to bond the first to-be-coated subject to the second to-be-coated subject, characterized in that the applying step includes moving each of the to-be-coated subjects and the application head relative to each other in such a manner that, when the first to-be-coated subject to the second to-be-coated subject are bonded together on the basis of the bonding specification, an application direction in which the plurality of droplets are sequentially landed on the first to-be-coated subject intersects with an application direction in which the plurality of droplets are sequentially landed on the second to-be-coated subject.

BRIEF DESCRIPTION OF THE DRAWINGS

FIG. 10 is a plan view schematically showing positional relations between application heads and a substrate during an applying operation to be executed by a droplet applying device representing a modified example of the droplet applying device shown in FIG. 2.

BEST MODES FOR CARRYING OUT THE INVENTION

An embodiment of the present invention will be described with reference to the drawings.

Figure 1:
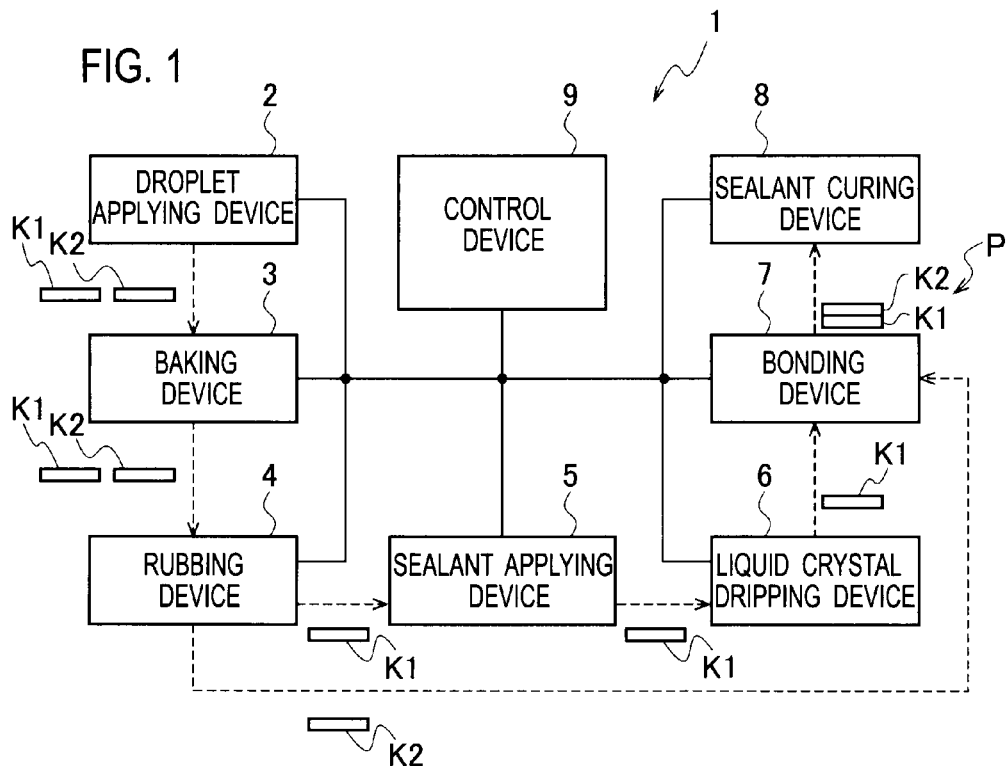
FIG. 1 is a block diagram showing a schematic configuration of a liquid crystal display panel manufacturing apparatus according to an embodiment of the present invention.

As shown in FIG. 1, a liquid crystal display panel manufacturing apparatus 1 includes a droplet applying device 2 configured to apply droplets to a first substrate K1 and a second substrate K2 (hereinafter simply referred to as the substrates K1, K2) each existing as a to-be-coated subject, a baking device 3 configured to perform baking processing on the substrate K1 and the substrate K2 having the droplets applied thereto, a rubbing device 4 configured to perform rubbing processing on the substrate K1 and the substrate K2 having the baking processing performed thereon, a sealant applying device 5 configured to apply a sealant to the substrate K1 having the rubbing processing performed thereon, a liquid crystal dripping device 6 configured to drip liquid crystal on the substrate K1 having the sealant applied thereto, a bonding device 7 configured to bond the substrate K1 having the liquid crystal dripped thereon to the substrate K2 having the rubbing processing performed thereon, a sealant curing device 8 configured to cure a sealant on a liquid crystal display panel P that is formed of the substrate K1 and the substrate K2 bonded together, and a control device 9 configured to control each of the above-mentioned units.

Figure 2:
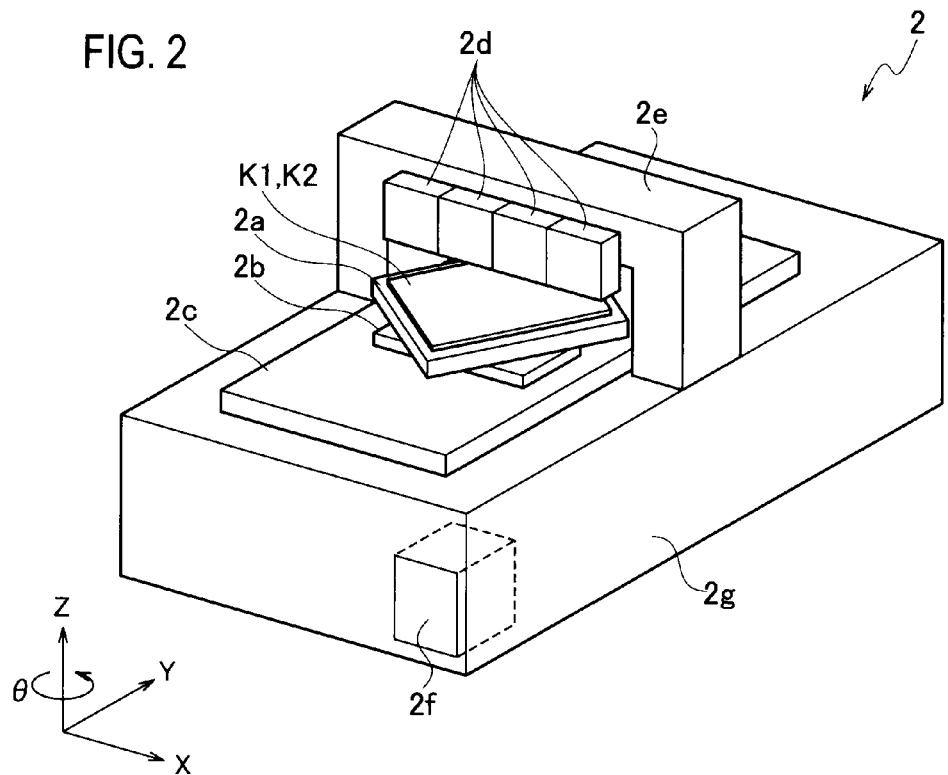
FIG. 2 is an external perspective view showing a schematic configuration of a droplet applying device included in the liquid crystal display panel manufacturing apparatus shown in FIG. 1.

As shown in FIG. 2, the droplet applying device 2 includes a stage 2a on which the substrates K1, K2 are placed in a horizontal state (in a state along an x-axis direction and a y-axis direction perpendicular thereto in FIG. 2), a rotating mechanism 2b configured to rotate the stage 2a in a θ direction (a rotating direction in a plane along the X-axis direction and the y-axis direction in FIG. 2), a y-axis moving mechanism 2c configured to move the stage 2a in the y-axis direction using the rotating mechanism 2b, multiple application heads 2d configured to eject an application liquid in the form of multiple droplets toward the substrates K1, K2 on the stage 2a, a supporting member 2e configured to support those application heads 2d, a control unit 2f configured to control each of the above-mentioned units, and a mount 2g configured to support the y-axis moving mechanism 2c and the supporting member 2e.

The stage 2a is placed on the rotating mechanism 2b and is provided to be rotatable in the θ direction about a center thereof as a rotating center. The stage 2a is rotated in the θ direction by the rotating mechanism 2b. Here, the substrates K1, K2 are placed on the stage 2a by own weight. However, the invention is not limited to this configuration but may also have a configuration in which a mechanism such as an electrostatic chuck or a suction chuck is provided to hold the substrates K1, K2, or in which multiple protrudable/retractable supporting pins are provided to support the substrates K1, K2, for example.

The rotating mechanism 2b is placed on the y-axis moving mechanism 2c and is provided to be movable in the y-axis direction. The rotating mechanism 2b moves in the y-axis direction together with the stage 2a using the y-axis moving mechanism 2c. The rotating mechanism 2b is electrically connected to the control unit 2f and drive thereof is controlled by the control unit 2f. Here, a rotating mechanism including a motor as a driving source or the like is used as the rotating mechanism 2b, for example.

The y-axis moving mechanism 2c is the moving mechanism which is placed on the mount 2g and configured to guide and move the rotating mechanism 2b as well as the stage 2a in the y-axis direction. The y-axis moving mechanism 2c is electrically connected to the control unit 2f and drive thereof is controlled by the control unit 2f. Here, a linear motor moving mechanism including a linear motor as a driving source or a feed screw moving mechanism including a motor as a driving source is used as the y-axis moving mechanism 2c, for example.

The application heads 2d are arranged in a linear fashion or in a staggered fashion along the supporting member 2e. Each of these application heads 2d incorporates multiple liquid chambers respectively communicated with multiple ejection holes to eject the droplets, and multiple piezoelectric elements configured to change volumes of those liquid chambers (none of the constituents are shown). The ejection holes are formed on an ejection surface of the application head 2d so as to be arranged linearly at a predetermined pitch (intervals). For example, the number of the ejection holes ranges from several tens to several hundreds and the diameter of the ejection holes ranges from several micrometers to several tens of micrometers. Moreover, the pitch of the ejection holes ranges from several tens of micrometers to several hundreds of micrometers. The application heads 2d are electrically connected to the control unit 2f and drive thereof is controlled by the control unit 2f.

The application heads 2d change the volumes of the liquid chambers by using the piezoelectric elements in response to application of driving voltages to the piezoelectric elements, and eject the application liquid inside the liquid chambers as droplets from the ejection holes respectively communicated with those liquid chambers. The application liquid for forming an alignment film is supplied from a liquid tank configured to store the application liquid into the liquid chambers via tubes or the like. In this way, the liquid chambers are filled with the application liquid. When a piezoelectric element is driven in this state, the application liquid inside the liquid chamber corresponding to the driven piezoelectric element is pushed out of the ejection holes communicated with the liquid chamber, and are ejected as droplets. Here, a polyimide (PI) solution is used as the application liquid for forming the alignment film, for example.

The supporting member 2e is a gate-shaped column configured to support the application heads 2d. An extended portion of the supporting member 2e is positioned along the x-axis direction and legs thereof are provided on the mount 2g so as to be fixed to an upper surface of the mount 2g. Here, the application heads 2d are provided on a front surface (a surface located on a front side in FIG. 2) of the extended portion.

The control unit 2f includes a microcomputer configured to intensively control each unit, and a storage unit configured to store application information concerning application, various programs, and the like (none of the constituents are shown). This control unit 2f is provided inside the mount 2g. The application information includes information concerning a predetermined application pattern such as a dot pattern, ejection frequency of the application heads 2d, moving speeds of the substrates K1, K2, and the like. When performing an applying operation, the above-described control unit 2f controls the rotating mechanism 2b, the y-axis moving mechanism 2c, and the application heads 2d based on the application information.

Figure 3:
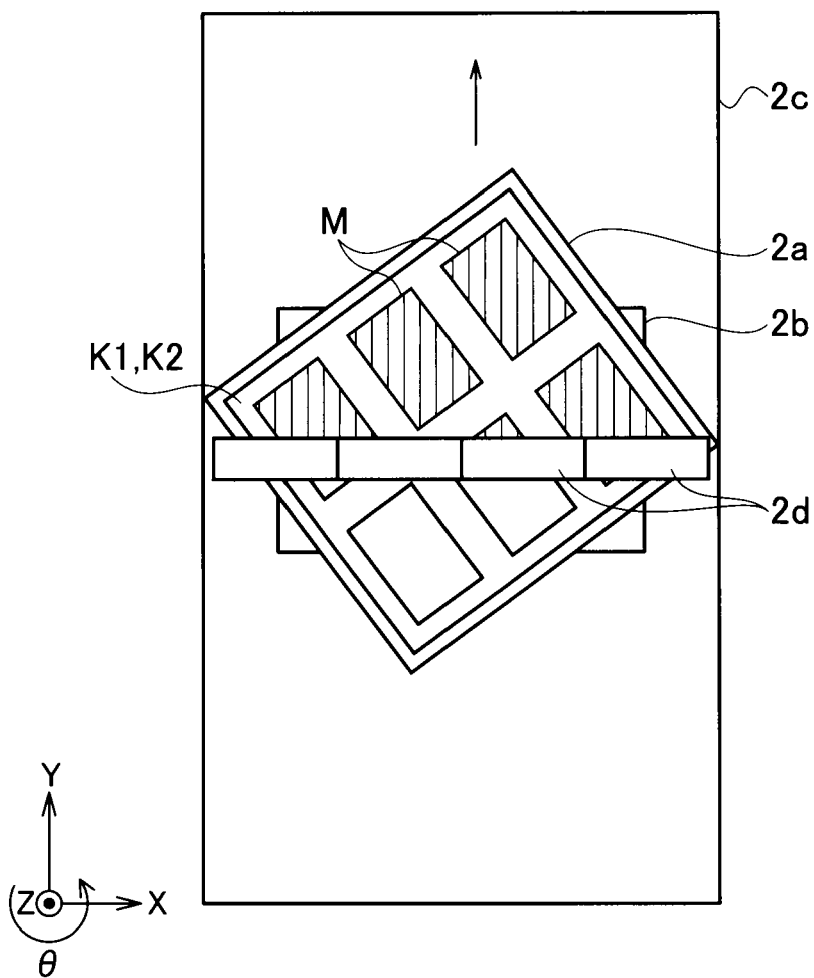
FIG. 3 is a plan view schematically showing positional relations between application heads and a substrate during an applying operation to be executed by the droplet applying device shown in FIG. 2.

In the applying operation, the control unit 2f controls the rotating mechanism 2b and inclines the substrates K1, K2 on the stage 2a as shown in FIG. 3 with respect to a direction of relative movement (an arrow in FIG. 3: a fast scan direction) between the application heads 2d and the substrates K1, K2 in a plane intersecting with an ejecting direction in which multiple droplets are ejected from the application heads 2d, or in a plane perpendicular to the ejecting direction (in a plane along the x-axis direction and the y-axis direction in FIG. 3), for example. Specifically, the control unit 2f rotates the substrates K1, K2 on the stage 2a just by a predetermined angle in the θ direction by using the rotating mechanism 2b. In this state, the control unit 2f controls the y-axis moving mechanism 2c and the application heads 2d, applies the droplets to the substrates K1, K2 on the state by using the application heads 2d while moving the application heads 2d and the substrates K1, K2 relative to each other on the stage 2a by using the y-axis moving mechanism 2c, and thereby forms multiple alignment films M on the substrates K1, K2. These alignment films M are formed on multiple display areas provided on the substrates K1, K2 for the purpose of obtaining multiple panels.

Back to FIG. 1, the baking device includes a hot plate, a baking furnace or the like. This baking device 3 performs the baking processing on the substrates K1, K2 with the alignment films M applied thereto and dries the alignment films M on the substrates K1, K2.

Figure 4:
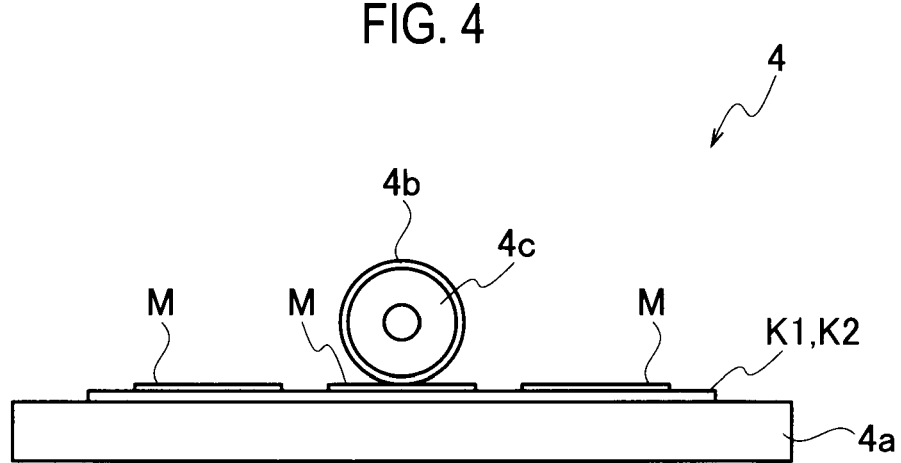
FIG. 4 is a schematic diagram showing a schematic configuration of a rubbing device included in the liquid crystal display panel manufacturing apparatus shown in FIG. 1.

As shown in FIG. 4, the rubbing device 4 includes a stage 4a on which the substrates K1, K2 are placed, and a rubbing roller 4c configured to perform rubbing on the alignment films M of the substrates K1, K2 on the stage 4a by using a rubbing cloth 4b. The Stage 4a and the rubbing roller 4c are formed so as to be movable relative to each other in a planar direction of the substrates K1, K2. The rubbing cloth 4b is provided so as to be wound around the rubbing roller 4c. This rubbing device 4 moves the stage 4a and the rubbing roller 4c relative to each other and performs the rubbing processing on the substrates K1, K2 on the relatively moving stage 4a. In this way, numerous tiny scratches (groove-like scratches) extending in a predetermined direction are formed on surfaces of the alignment films M of the substrates K1, K2. As a result, the alignment films M of the substrates K1, K2 can align liquid crystal molecules with the direction of extension of the numerous scratches.

Figure 5:
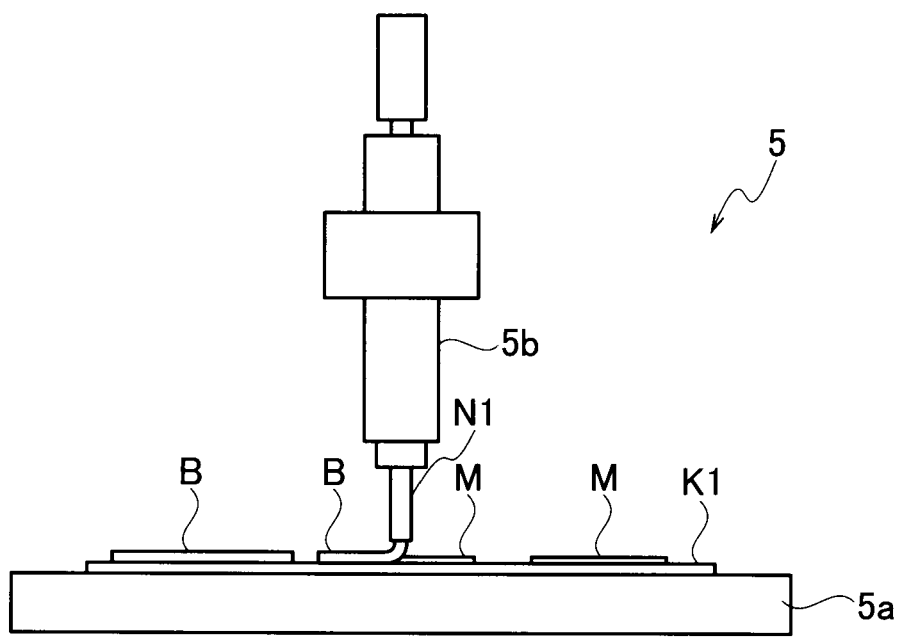
FIG. 5 is a schematic diagram showing a schematic configuration of a sealant applying device included in the liquid crystal display panel manufacturing apparatus shown in FIG. 1.

As shown in FIG. 5, the sealant applying device 5 includes a stage 5a on which the substrate K1 having the rubbing processing performed thereon is placed, and a sealant application head 5b configured to apply a sealant B around the alignment films M of the substrate K1 on the stage 5a. The stage 5a and the sealant application head 5b are formed so as to be movable relative to each other in the planar direction of the substrate K1. The sealant application head 5b includes a nozzle N1 for ejecting the sealant B, which applies the sealant B to the substrate K1 on the relatively moving stage 5a. This sealant applying device 5 moves the stage 5a and the sealant application head 5b relative to each other on the basis of an application pattern of the sealant, and applies the sealant B to the substrate K1 on the relatively moving stage 5a by using the sealant application head 5b. At this time, the sealant application head 5b applies the sealant B to peripheries of the alignment films M of the substrate K1, or more specifically, in order for the sealant B to surround the display areas. In this way, a pattern of the sealant in a rectangular shape is formed around the alignment films M of the substrate K1 so as to surround the display areas.

Figure 6:
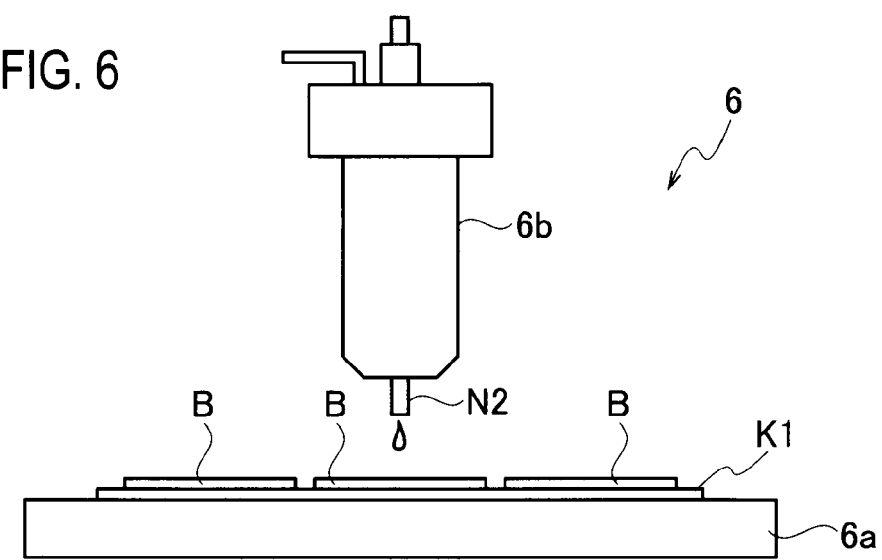
FIG. 6 is a schematic diagram showing a schematic configuration of a liquid crystal dripping device included in the liquid crystal display panel manufacturing apparatus shown in FIG. 1.

As shown in FIG. 6, the liquid crystal dripping device 6 includes a stage 6a on which the substrate K1 having the sealant B applied thereon is placed, and a liquid crystal dripping head 6b configured to drip liquid crystal on the display areas (the areas surrounded by the sealant B) of the substrate K1 on the stage 6a. The stage 6a and the liquid crystal dripping head 6b are formed so as to be movable relative to each other in the planar direction of the substrate K1. The liquid crystal dripping head 6b includes a nozzle N2 for dripping the liquid crystal, which drips the liquid crystal on the substrate K1 on the stage 6a. This liquid crystal dripping device 6 moves the stage 6a and the liquid crystal dripping head 6b relative to each other to locate the liquid crystal dripping head 6b in a predetermined dripping position, and drips the liquid crystal on the substrate K1 on the stage 6a by using the liquid crystal dripping head 6b. At this time, the liquid crystal dripping head 6b drips the liquid crystal several times on the display areas, of the substrate K1, i.e. on the areas surrounded by the sealant B in accordance with a necessary amount of the liquid crystal. In this way, the necessary amount of the liquid crystal is dripped on the display areas of the substrate K1.

Figure 7:
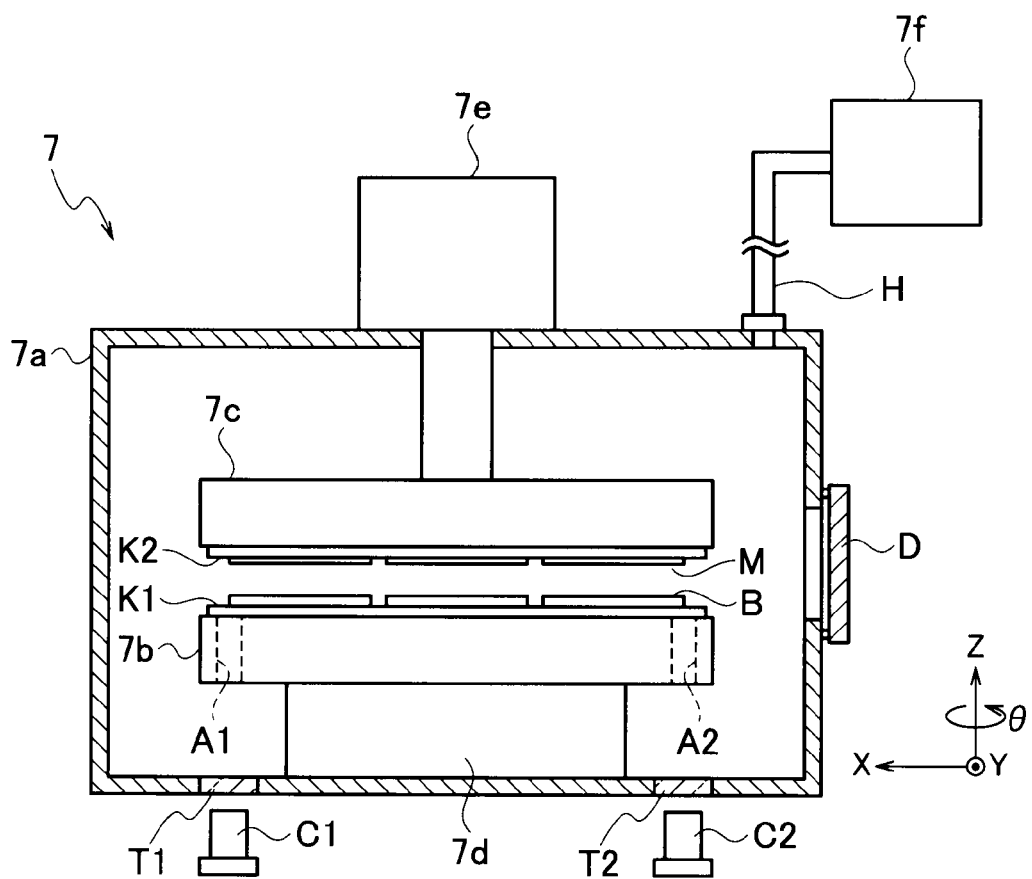
FIG. 7 is a schematic diagram showing a schematic configuration of a bonding device included in the liquid crystal display panel manufacturing apparatus shown in FIG. 1.

As shown in FIG. 7, the bonding device 7 includes a vacuum chamber 7a which is a vacuum container, a first stage 7b serving as a first substrate holding unit provided inside the vacuum chamber 7a and configured to hold the substrate K1 in a horizontal state (in a state along the x-axis direction and the y-axis direction perpendicular thereto in FIG. 7), a second stage 7c serving as a second substrate holding unit provided inside the vacuum chamber 7a and configured to hold the substrate K2 in the horizontal state, a first stage moving mechanism 7d configured to move the first stage 7b in the x, y, and θ directions, a second stage moving mechanism 7e configured to move the second stage 7c in a z-axis direction which is an approaching and receding direction relative to the first stage 7b, and a decompression unit 7f configured to decompress the inside of the vacuum chamber 7a.

The vacuum chamber 7a includes a door D formed so as to be openable and closable. The substrates K1, K2 are fed into the vacuum chamber 7a and are respectively supplied to the first stage 7b and the second stage 7c. In the state with the door D closed, the inside of the vacuum chamber 7a is decompressed by the decompression unit 7f and is set to a vacuum state (a state having a lower pressure than the atmospheric pressure).

Multiple image pickup units C1 and C2 for substrate alignment are provided below the vacuum chamber 7a. CCD cameras and the like are used as these image pickup units C1 and C2, for example. Moreover, the vacuum chamber 7a is provided with multiple translucent portions T1 and T2 having translucency while the first stage 7b is provided with multiple through holes A1 and A2 respectively facing those translucent portions T1 and T2. The translucent portions T1 and T2 and the through holes A1 and A2 are located and provided so as to enable the image pickup units C1 and C2 to pick up multiple alignment marks (marks for positioning) which are respectively formed on ends of the substrate K1 and ends of the substrate K2.

The first stage 7b is a lower stage configured to hold the substrate K1 by using a holding mechanism such as suction adsorption or electrostatic adsorption. The substrate K1 is placed on a holding surface of the first stage 7b and held by the holding mechanism. Here, the alignment films M and the frame-shaped sealant B are applied to a bonding surface (a surface facing the second stage 7c) of the substrate K1, and the liquid crystal is further dripped thereon.

The second stage 7c is an upper stage configured to hold the substrate K2 so as to face the substrate K1 by using a holding mechanism such as suction adsorption or electrostatic adsorption. The substrate K2 is placed on a holding surface of the second stage 7c and held by the holding mechanism. Here, the alignment films M are applied to a bonding surface (a surface facing the first stage 7b) of the substrate K2.

The first stage moving mechanism 7d is the mechanism configured to move the first stage 7b in the x-axis direction, the y-axis direction, and the θ direction (the rotating direction in the plane along the x-axis direction and the y-axis direction in FIG. 7). This first stage moving mechanism 7d moves the first stage 7b in the x, y, and θ directions and aligns the substrate K1 with the substrate K2 in a separated state. Here, the alignment marks located at the ends of the substrate K1 and the alignment marks located at the ends of the substrate K2 are picked up with the respective image pickup units C1 and C2, and the alignment is performed based on those images.

The second stage moving mechanism 7e is the mechanism configured to move the second stage 7c in the z-axis direction. When the vacuum chamber 7a is in the vacuum state, the second stage moving mechanism 7e moves the second stage 7c in the z-axis direction, brings the first stage 7b closer to the second stage 7c, and bonds the substrate K1 to the substrate K2 via the sealant B.

The decompression unit 7f is connected to the vacuum chamber 7a by using an exhaust pipe H serving as exhaust piping for evacuating an atmosphere (a gas) inside the vacuum chamber 7a. A vacuum pump is used as the decompression unit 7f, for example. The decompression unit 7f sucks and evacuates the atmosphere inside the vacuum chamber 7a through the exhaust pipe H and establishes the vacuum state by decompressing the inside of the vacuum chamber 7a.

Back to FIG. 1, the sealant curing device 8 is an ultraviolet irradiating apparatus configured to irradiate the liquid crystal display panel P formed of the substrate K1 and the substrate K2 bonded together. This applies to a case of using ultraviolet curable resin as the sealant B. Accordingly, another sealant curing device is used in a case where another sealant is used. The liquid crystal display panel P is irradiated with ultraviolet rays by the sealant curing device 8, whereby the sealant B in the liquid crystal display panel P is cured.

The control device 9 includes a microcomputer configured to intensively control each unit, and a storage unit configured to store manufacturing information concerning liquid crystal display panel manufacturing, various programs, and the like (none of the constituents are shown). On the basis of the manufacturing information and various programs, the control device 9 controls the droplet applying device 2, the baking device 3, the rubbing device 4, the sealant applying device 5, the liquid crystal dripping device 6, the bonding device 7, the sealant curing device 8, and the like. Here, conveyance of the substrates K1, K2 between these apparatuses is performed by a carrier device (not shown) such as a robot or a belt conveyor. This carrier device is also controlled by the control device 9.

Next, manufacturing operations to be executed by the manufacturing apparatus 1 for the above-described liquid crystal display panel P will be explained. Here, the control device 9 of the manufacturing apparatus 1 executes a manufacturing process, based on various programs.

Figure 8:
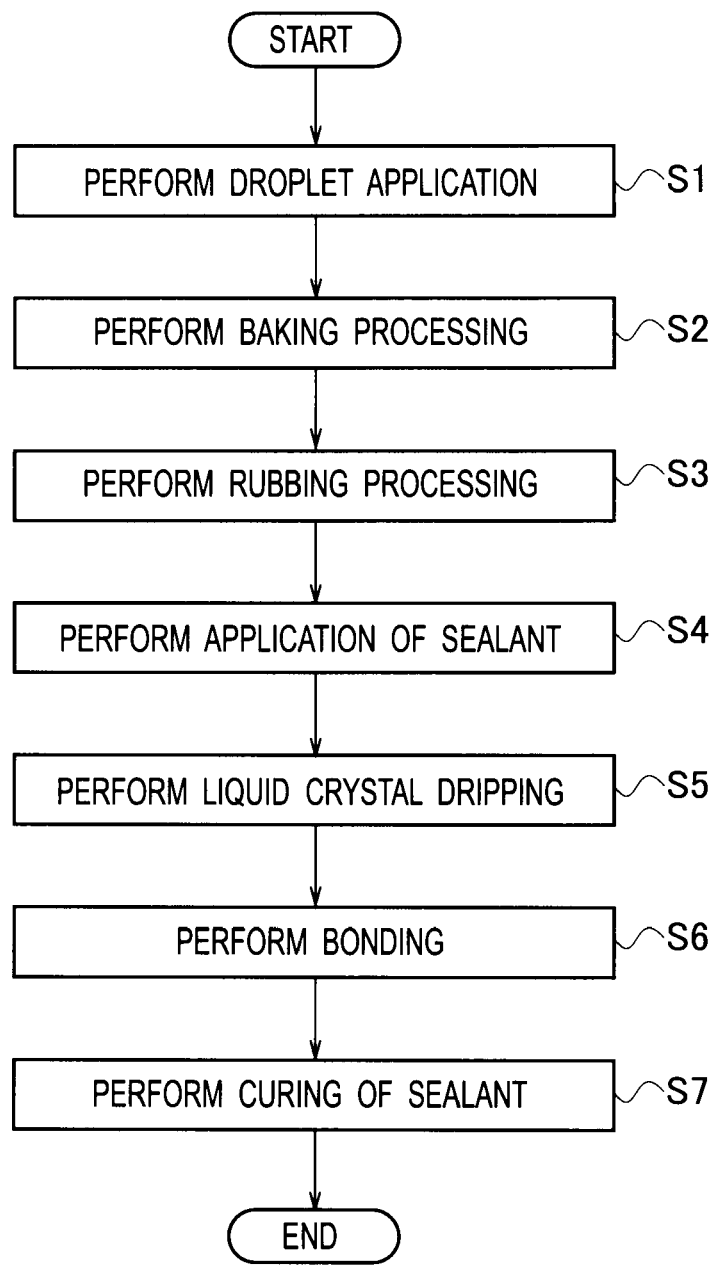
FIG. 8 is a flowchart showing a flow of manufacturing operations to be executed by the liquid crystal display panel manufacturing apparatus shown in FIG. 1.

As shown in FIG. 8, the control device 9 performs droplet application on the substrates K1, K2 by using the droplet applying device (step S1). For example, the control device 9 transmits an instruction signal to the droplet applying device 2 to execute a droplet applying operation. The control unit 2f of the droplet applying device 2 executes droplet application processing in response to the control by (upon receipt of the instruction signal from) the control device 9.

When the substrates K1, K2 are placed on the stage 2a, the control unit 2f of the droplet applying device 2 controls the rotating mechanism 2b on the basis of the application information, then rotates the substrates K1, K2 on the stage 2a in the θ direction, and stops the substrates at a given angle (see FIG. 3). Subsequently, the control unit 2f controls the y-axis moving mechanism 2c on the basis of the application information, and moves the substrates K1, K2 on the stage 2a to a predetermined application starting portion. Thereafter, the control unit 2f controls the y-axis moving mechanism 2c and the application heads 2d on the basis of the application information, then causes the heads 2d to eject the application liquid as multiple droplets while moving the stage 2a in the y-axis direction, and applies the droplets to coated surfaces (the display areas on the coated surfaces) of the substrates K1, K2 on the stage 2a. At this time, the application heads 2d eject the droplets toward the coated surfaces of the substrates K1, K2 on the stage 2a moving in the y-axis direction, and apply dot rows arranged along the x-axis direction sequentially in the y-axis direction. In this way, the multiple alignment films M are formed on the coated surfaces of the substrates K1, K2. Here, the application heads 2d are arranged in the x-axis direction, which is perpendicular to the moving direction of the substrates K1, K2 so as to encompass the entire widths of the substrates K1, K2. Accordingly, the alignment films M can be formed at a time in the display areas on the coated surfaces of the substrates K1, K2.

Figure 9:
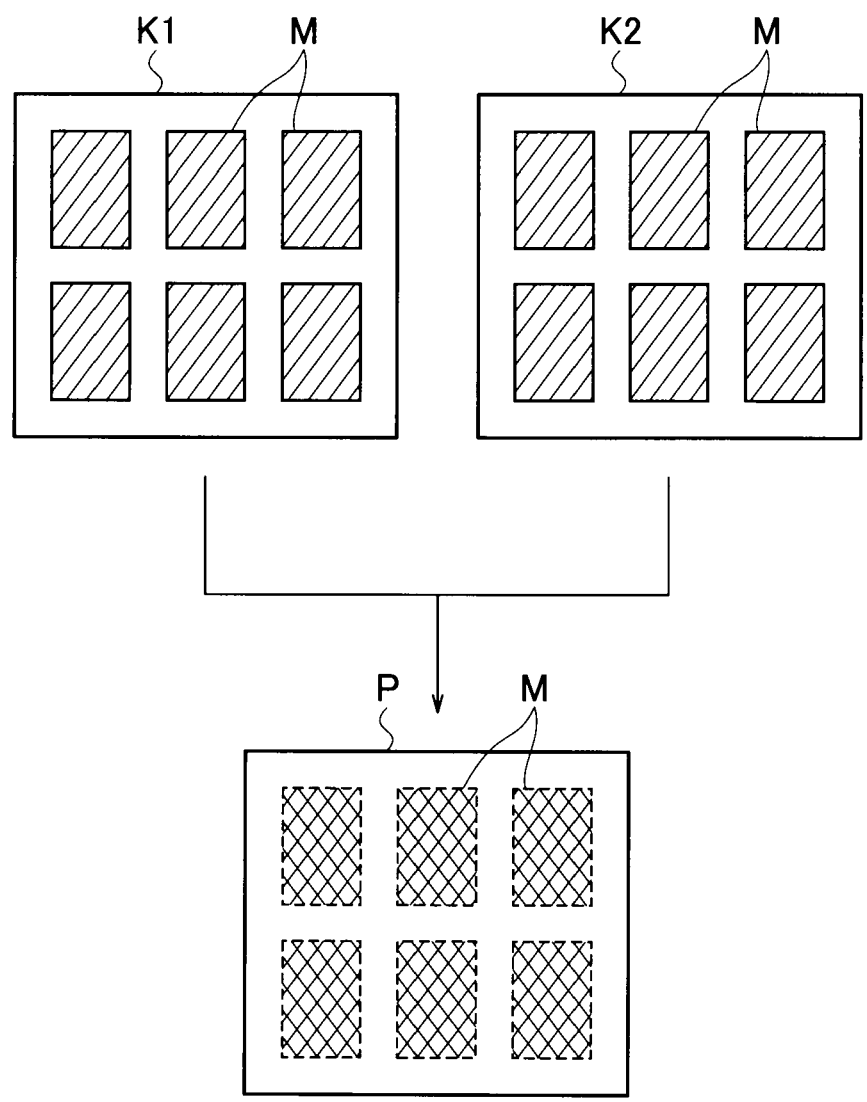
FIG. 9 is an explanatory view for explaining droplet application and bonding based on the manufacturing operations to be executed by the liquid crystal display panel manufacturing apparatus shown in FIG. 1.

In this way, the alignment films M are formed on the substrates K1, K2 as shown in FIG. 9. Since the substrates K1, K2 are inclined in the θ direction relative to the moving direction of the substrates K1, K2 on the stage 2a (see FIG. 3), an application direction of the alignment films M is inclined (see oblique lines in FIG. 9).

Here, the substrate K1 is an array substrate in which each of the display areas is provided with electrical circuits including multiple TFTs (thin film transistors) and multiple pixel electrodes, for example. Meanwhile, the substrate K2 is a counter substrate in which each of the display areas is provided with a counter electrode, color filters, and the like, for example. Positional relations between the TFTs and the pixel electrodes on the substrate K1 and colored layers and a black matrix of the color filters on the substrate K2 are determined by design. Accordingly, a combination of the substrate K1 and the substrate K2 is predetermined. Therefore, the substrate K1 and the substrate K2 are bonded together based on a bonding specification which defines the combination. Specifically, the bonding specification is a definition of combination for bonding the substrate K1 to the substrate K2 after application, which defines in which direction the two substrates K1, K2 are to be placed and which surfaces of the substrates are to face each other in the boding.

For example, in FIG. 9, the substrate K2 after application is turned upside down and is bonded to the substrate K1 with the alignment films M on the substrate K2 facing the corresponding alignment films M on the substrate K1. Specifically, the substrate K1 is bonded to the substrate K2 so that the alignment film M on an upper left part of the substrate K1 can face the alignment film M on an upper right part of the substrate K2, the alignment film M on an upper central part of the substrate K1 can face the alignment film M on an upper central part of the substrate K2, the alignment film M on an upper right part of the substrate K1 can face the alignment film M on an upper left part of the substrate K2, the alignment film M on a lower left part of the substrate K1 can face the alignment film M on a lower right part of the substrate K2, the alignment film M on a lower central part of the substrate K1 can face the alignment film M on a lower central part of the substrate K2, and the alignment film M on a lower right part of the substrate K1 can face the alignment film M on a lower left part of the substrate K2. The above-described bonding is performed based on the bonding specification.

Therefore, the rotating mechanism 2b performs a rotating operation of inclining the substrate K1 and the substrate K2 with respect to a relative movement direction of the application heads 2d and the substrates K1, K2 (fast scan direction) so that an application direction in which droplets are sequentially landed on the substrate K1 (application direction of the alignment films M) can intersect with an application direction in which droplets are sequentially landed on the substrate K2 (application direction of the alignment films M) in a case where the first to-be-coated subject and the second to-be-coated subject are bonded together on the basis of the bonding specification that defines the combination of the substrate K1 and the substrate K2. Here, the rotating mechanism 2b does not always have to rotate the substrates K1, K2 on the stage 2a in one round or more, but may be configured to be capable of adjusting the substrates K1, K2 on the stage 2a at least to such an extent that the application directions of the substrate K1 and the substrate K2 can intersect with each other.

Subsequently, the control device 9 performs the baking processing on the substrates K1, K2 after formation of the alignment films by using the baking device 3 (step S2). The baking device 3 performs the baking processing on the substrates K1, K2 provided with the alignment films M in response to the control by the control device 9. In this way, the alignment films M on the substrates K1, K2 are dried.

Further, the control device 9 performs the rubbing processing on the substrates K1, K2 after the baking processing by using the rubbing device 4 (step S3). When the substrates K1, K2 are placed on the stage 4a, the rubbing device 4 moves the stage 4a and the rubbing roller 4c relative to each other in response to the control by the control device 9, and thereby performs the rubbing processing on the substrates K1, K2 on the relatively moving stage 4a (see FIG. 4). In this way, the numerous tiny scratches (the groove-like scratches) extending in the predetermined direction are formed on the surfaces of the alignment films M of the substrates K1, K2.

Then, the control device 9 performs application of the sealant to the substrate K1 after the rubbing processing by using the sealant applying device 5 (step S4). When the substrate K1 is placed on the stage 5a, the sealant applying device 5 moves the stage 5a and the sealant application head 5b relative to each other on the basis of the application pattern of the sealant B in response to the control by the control device 9, and applies the sealant B to the substrate K1 on the relatively moving stage 5a by using the sealant application head 5b (see FIG. 5). At this time, the sealant applying device 5 applies the sealant B to the peripheries of the alignment films M of the substrate K1, or more specifically, in order for the sealant B to surround the predetermined display areas. In this way, the sealant B is applied around the alignment films M of the substrate K1 so as to surround the display areas.

Further, the control device 9 performs liquid crystal dripping on the substrate K1 after application of the sealant to by using the liquid crystal dripping device 6 (step S5). When the substrate K1 is placed on the stage 6a, the liquid crystal dripping device 6 moves the stage 6a and the liquid crystal dripping head 6b relative to each other, then locates the liquid crystal dripping head 6b in the predetermined dripping position, and drips the liquid crystal on the substrate K1 on the stage 6a by using the liquid crystal dripping head 6b. At this time, the liquid crystal dripping device 6 drips the liquid crystal several times on the display areas of the substrate K1, i.e. on the areas surrounded by the sealant B in accordance with the necessary amount of the liquid crystal. In this way, the necessary amount of the liquid crystal is dripped on the display areas surrounded by the sealant B.

Then, the control device 9 causes the bonding device 7 to bond the substrate K1 after the liquid crystal dripping to the substrate K2 after the rubbing processing (step S6). When the substrate K1 and the substrate K2 are respectively held on the first stage 7b and the second stage 7c, the bonding device 7 sucks and evacuates the atmosphere inside the vacuum chamber 7a through the exhaust pipe H by using the decompression unit 7f, and establishes the vacuum state by decompressing the inside of the vacuum chamber 7a in response to the control by the control device 9 (see FIG. 7). In that state, the bonding device 7 moves the second stage 7c in the z-axis direction, then brings the first stage 7b closer to the second stage 7c, and bonds the substrate K1 to the substrate K2 through the sealant B, thereby forming the liquid crystal display panel P. Here, the substrate K1 and the substrate K2 before bonding are respectively supplied to the first stage 7b and the second stage 7c through the door D of the vacuum chamber 7a, and the liquid crystal display panel P after bonding is taken out of the door D of the vacuum chamber 7a.

In this bonding step, as described above, the substrate K2 as shown in FIG. 2 is turned upside down and is bonded to the substrate K1 with the alignment films M on the substrate K2 facing the corresponding alignment films M on the substrate K1. The above-described bonding is performed based on the bonding specification. In this way, the application direction for the substrate K1 intersects with the application direction for the substrate K2 so as to form a rhombic lattice.

Lastly, the control device 9 cures the sealant in the liquid crystal display panel P by using the sealant curing device 8 (step S7). The sealant curing device 8 irradiates with ultraviolet rays the liquid crystal display panel P that is formed by bonding the substrate K1 to the substrate K2. In this way, the liquid crystal display panel P is irradiated with the ultraviolet rays and the sealant B in the liquid crystal display panel P is cured.

In the applying step of the above-described manufacturing operations, the substrates K1, K2 are each inclined with respect to the relative movement direction of the substrates K1, K2 and the application heads 2d (fast scan direction) so that the application direction for the substrate K1 can intersect with the application direction for the substrate K2 in the case where the substrate K1 and the substrate K2 after application are bonded together based on the bonding specification of the substrates k1, k2. Specifically, the rotating mechanism 2b inclines the stage 2a just by the predetermined angle in the θ direction and the substrates K1, K2 on the stage 2a are rotated in the θ direction and then stopped. In this state, the droplets are sequentially applied to the substrates K1, K2 on the stage 2a by using the application heads 2d while the y-axis moving mechanism 2c is moving the stage 2a in the y-axis direction.

Thereafter, in the bonding step, the substrate K2 after application is turned upside down and is bonded to the substrate K1 with the alignment films M on the substrate K2 are made facing the corresponding alignment films M on the substrate K1 as shown in FIG. 9. This bonding is performed based on the bonding specification. In this way, the application direction for the substrate K1 intersects with the application direction for the substrate K2 so as to form the rhombic lattice. Therefore, even if streaky application unevenness is formed along the application direction of the alignment films M of the substrates K1, K2, the streaky application unevenness can be prevented from being overlapped and emphasized due to the bonding of the two substrates K1, K2 and from emerging as display unevenness, thereby rendering the application unevenness less conspicuous as compared to conventional streaky (vertically striped) display unevenness. Hence, it is possible to prevent degradation in quality of the liquid crystal display panel P.

As described above, the embodiment of the present invention is provided with the rotating mechanism 2b configured to rotate the substrates K1, K2 in the plane intersecting with the ejecting direction in which the droplets are ejected. Thereby, the droplets can be sequentially applied to the substrates K1, K2 so that the application direction for the substrate K1 can intersect with the application direction for the substrate K2 in the case where the substrate K1 and the substrate K2 after the application are bonded together. In this way, in the state where the substrate K1 and the substrate K2 provided with the alignment films M are bonded together, the application direction for the substrate K1 intersects with the application direction for the substrate K2. Therefore, even if streaky application unevenness in the application direction is formed in the alignment films M of the substrates K1, K2, the streaks of the application unevenness do not overlap each other as a result of the bonding of the two substrates K1, K2. Thus, the streaky application unevenness can be prevented from being emphasized and emerging as display unevenness, and thus is less conspicuous than the conventional streaky (vertically striped) display unevenness. As a result, it is possible to prevent degradation in quality of the liquid crystal display panel P attributable to the streaky display unevenness. In particular, the rotating mechanism 2b rotates the substrates K1, K2 so that the application direction for the substrate K1 can intersect with the application direction for the substrate K2 when the substrate K1 and the substrate K2 after application are bonded together on the basis of the bonding specification used to bond the substrate K1 to the substrate K2 after application.

Moreover, the rotating mechanism 2b inclines the substrates K1, K2 with respect to the relative movement direction of the substrates K1, K2 and the application heads 2d in the plane intersecting with the ejecting direction in which the droplets are ejected, whereby the directions of application of the alignment films M are inclined. Accordingly, when the substrate K1 and the substrate K2 provided with the alignment films M are bonded together, the application direction for the substrate K1 intersects with the application direction for the substrate K2 so as to form a rhombic lattice or a square lattice. Therefore, even if the streaky application unevenness is formed along the application direction of the alignment films M, the streaky application unevenness can be prevented from being overlapped and emphasized due to the bonding of the two substrates K1, K2 and from emerging as the display unevenness, thereby rendering the application unevenness on the liquid crystal display panel P less conspicuous.

(Other Embodiments)

It is to be noted that the present invention is not limited only to the above-described embodiment but various other modifications may be made without departing from the gist thereof.

For example, in the embodiment of the present invention, the droplets are obliquely applied to the substrate K1 and the substrate K2 sequentially and then the substrate K1 is bonded to the substrate K2. However, the invention is not limited to this configuration. For example, it is also possible to apply the droplets sequentially to the substrate K1 so as to form vertical lines, then to apply the droplets sequentially to the substrate K2 so as to form horizontal lines, and to bond the substrate K1 to the substrate K2. In this case, similar operation and effect to those in the above-described embodiment can be obtained as well. Moreover, it is also possible to apply the droplets sequentially to the substrate K1 in a lattice fashion, then to apply the droplets sequentially to the substrate K2 in a zigzag fashion (in a triangular wave fashion, for example), and to bond the substrate K1 to the substrate K2. Furthermore, it is also possible to apply the droplets sequentially to the substrate K1 in a rhombic lattice fashion, then to apply the droplets sequentially to the substrate K2 in the zigzag fashion, and to bond the substrate K1 to the substrate K2. In these cases, the rotating mechanism $2b$ is controlled by the control unit $2f$ on the basis of application patterns in the lattice fashion and the zigzag fashion.

Meanwhile, the above-described embodiment is configured to move the substrates K1, K2 relative to the application heads $2d$. However, the invention is not limited to this configuration. The application heads $2d$ may be moved relative to the substrates K1, K2 as long as relative movements are possible between the substrates K1, K2 and the application heads $2d$.

Moreover, in the above-described embodiment, the multiple application heads $2d$ are used by arranging in the x-axis direction perpendicular to the moving direction of the substrates K1, K2 so as to encompass the entire widths of the substrates K1, K2. However, the invention is not limited to this configuration. It is also possible to use a single application head $2d$ or to arrange the multiple application heads $2d$ along the x-axis direction in a shorter length than the entire widths of the substrates K1, K2. In these cases, the control is performed so as to apply the application liquid to the entire coated surfaces of the substrates K1, K2 in several batches.

Moreover, although various numerical values are cited in the above-described embodiments, those numerical values are mere examples and the invention is not limited to those values.

Finally, in the above-described embodiment, the application direction is changed by rotating the substrates K1, K2 being the to-be-coated subjects. However, the invention is not limited to this configuration. For example, it is also possible to change the relative movement direction of the substrates K1, K2 and the application heads $2d$. In this case, an x-axis moving mechanism 11 configured to move the application heads $2d$ in the x-axis direction is provided on the supporting member $2e$ as shown in FIG. 10, for example, and the application heads $2d$ move in the x-axis direction at a predetermined moving speed by driving the x-axis moving mechanism 11 when the substrates K1, K2 are moving in the y-axis direction by use of the y-axis moving mechanism $2c$. As described above, the application direction is inclined by performing application while moving any of the application heads $2d$ and the substrates K1, K2 in the x-axis direction and moving the other in the y-axis direction at the same time. For example, if the application heads $2d$ and the substrates K1, K2 are moved relative to each other with the moving speeds in the x-axis direction and in the y-axis direction set equal to each other, then the application direction relative to the substrates K1, K2 is equal to 45°. Meanwhile, the application direction is approximately equal to 14° by setting a proportion of the moving speeds in the x-axis direction and in the y-axis direction equal to 1:4.

Industrial Applicability

Although the embodiments of the present invention have been described above, these are only specific examples which do not particularly limit the present invention. Specific configurations of the constituents and the like can be modified as appropriate. Moreover, the operation and effect described in conjunction with the embodiments are mere enumerations of the most preferred operation and effect arising from the present invention. The operation and effect of the present invention are not limited to those described in conjunction with the embodiments of the present invention. The present invention is used in an applying apparatus configured to apply droplets to a to-be-coated subject by ejecting the droplets thereto and an applying method, as well as in a manufacturing apparatus configured to manufacture a liquid crystal display panel and a manufacturing method, for example.

What is claimed is:

1. The droplet applying device, comprising:
   an application head configured to eject an application liquid as a plurality of droplets toward each to-be-coated subject;
   a moving mechanism configured to move the to-be-coated subject and the application head relative to each other;
   a rotating mechanism configured to rotate the to-be-coated subject in a plane intersecting with an ejecting direction in which the plurality of droplets are ejected; and
   a control unit configured to cause the rotating mechanism to rotate the to-be-coated subjects in such a manner that, when a first to-be-coated subject and a second to-be-coated subject, each being the to-be-coated subject having the application liquid applied thereto, are bonded together on the basis of a bonding specification used to bond together the first to-be-coated subject and the second to-be-coated subject, an application direction in which the plurality of droplets are sequentially landed on the first to-be-coated subject intersects with an application direction in which the plurality of droplets are sequentially landed on the second to-be-coated subject.

2. The liquid crystal display panel manufacturing apparatus, comprising:
   a droplet applying device including an application head configured to eject an application liquid as a plurality of droplets toward a to-be-coated subject, a moving mechanism configured to move the to-be-coated subject and the application head relative to each other, and a rotating mechanism configured to rotate the to-be-coated subject in a plane intersecting with an ejecting direction in which the plurality of droplets are ejected;

a bonding device configured to bond together a first to-be-coated subject and a second to-be-coated subject each being the to-be-coated subject having the application liquid applied thereto, on the basis of a bonding specification used to bond together the first to-be-coated subject and the second to-be-coated subject; and a control unit configured to cause the rotating mechanism to rotate the to-be-coated subjects in such a manner that, when the first to-be-coated subject and the second to-be-coated subject are bonded together on the basis of the bonding specification, an application direction in which the plurality of droplets are sequentially landed on the first to-be-coated subject intersects with an application direction in which the plurality of droplets are sequentially landed on the second to-be-coated subject.

* * * * *